United States Patent
Oh et al.

(10) Patent No.: US 12,332,797 B2
(45) Date of Patent: Jun. 17, 2025

(54) STORAGE MODULE SUPPORTING SINGLE SERIALIZED WRITE INTERFACING SCHEME AND OPERATION METHOD THEREOF

(71) Applicant: SAMSUNG ELECTRONICS CO., LTD.

(72) Inventors: Doohwan Oh, Suwon-si (KR); Wonjae Shin, Suwon-si (KR); Eunbyeol Ko, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 104 days.

(21) Appl. No.: 18/140,410

(22) Filed: Apr. 27, 2023

(65) Prior Publication Data
US 2024/0020234 A1    Jan. 18, 2024

(30) Foreign Application Priority Data
Jul. 14, 2022    (KR) .................. 10-2022-0087193

(51) Int. Cl.
*G06F 12/0842* (2016.01)
*G06F 12/0879* (2016.01)

(52) U.S. Cl.
CPC ...... *G06F 12/0842* (2013.01); *G06F 12/0879* (2013.01); *G06F 2212/272* (2013.01)

(58) Field of Classification Search
None
See application file for complete search history.

(56) References Cited

U.S. PATENT DOCUMENTS

| | | | |
|---|---|---|---|
| 5,684,978 A | 11/1997 | Sarma et al. | |
| 6,473,814 B1* | 10/2002 | Lyons | G06F 13/28 710/33 |
| 8,630,111 B2 | 1/2014 | Maheshwari et al. | |
| 10,222,853 B2 | 3/2019 | Suh et al. | |
| 10,672,441 B2 | 6/2020 | Penney et al. | |
| 10,755,753 B2 | 8/2020 | Kang et al. | |
| 11,030,128 B2 | 6/2021 | Betser et al. | |
| 2005/0144371 A1* | 6/2005 | Walker | G06F 12/0879 711/E12.053 |
| 2008/0301391 A1* | 12/2008 | Oh | G06F 13/28 711/E12.078 |
| 2009/0307446 A1 | 12/2009 | Johnson | |
| 2013/0223165 A1 | 8/2013 | Maheshwari et al. | |
| 2015/0149675 A1* | 5/2015 | Toyoda | G06F 13/366 710/113 |
| 2015/0177815 A1* | 6/2015 | Zerbe | G06F 1/3287 713/322 |

(Continued)

OTHER PUBLICATIONS

Proposed DDR4 Full spec update(79-4C), Committee Letter Ballot, Ballot Template Version Draft rev. 8/11, JEDEC, 2011, 258 pages.

(Continued)

*Primary Examiner* — Kaushikkumar M Patel
(74) *Attorney, Agent, or Firm* — Sughrue Mion, PLLC

(57) ABSTRACT

A method of operating a storage module, the method including setting a characteristic value based on information received from a host, the information including information related to a size of write data in units of cache lines, and successively receiving the write data in units of the cache lines based on a single write command received from the host.

20 Claims, 24 Drawing Sheets

(56) References Cited

U.S. PATENT DOCUMENTS

| | | | |
|---|---|---|---|
| 2016/0092383 A1 | 3/2016 | Bains et al. | |
| 2016/0378366 A1 | 12/2016 | Tomishima et al. | |
| 2017/0255394 A1 | 9/2017 | Suh et al. | |
| 2017/0351433 A1* | 12/2017 | Walker | G06F 3/0683 |
| 2018/0276149 A1 | 9/2018 | Bains | |
| 2018/0357009 A1 | 12/2018 | Ikarashi | |
| 2019/0138245 A1 | 5/2019 | Shin et al. | |
| 2019/0252009 A1 | 8/2019 | Kang et al. | |
| 2019/0259433 A1 | 8/2019 | Penney et al. | |
| 2019/0339906 A1 | 11/2019 | Murayama | |
| 2021/0042245 A1 | 2/2021 | Betser et al. | |
| 2022/0187988 A1 | 6/2022 | Gans et al. | |
| 2022/0383916 A1* | 12/2022 | Park | G11C 7/1063 |
| 2023/0022530 A1* | 1/2023 | Haywood | G11C 7/1084 |
| 2023/0289063 A1* | 9/2023 | Hsieh | G06F 13/28 |

OTHER PUBLICATIONS

DDR5 Full Spec Draft Rev1.81, Proposed DDR5 Full spec (79-5A), Committee Letter Ballot, Ballot Template Version draft rev. 8/11, JEDEC, 2011, 503 pages.

European Extended Search Report issued Dec. 19, 2023 by the European Patent Office for EP Patent Application No. 23184647.8.

* cited by examiner

FIG.7A

MRS (DDR4)

| Function | BG | BA | CS_n | ACT_n | RAS_n /A16 | CAS_n /A15 | WE_n /A14 |
|---|---|---|---|---|---|---|---|
| | Previous Cycle / Previous Cycle | Previous Cycle / Current Cycle | | | | | |
| MRS | H | H | L | H | L | L | L |
| | BG0-BG1 | BA0-BA1 | C2-C0 | A12/BC_n | A17, A13, A11 | A10/AP | A0-A9 |
| | BG | BA | V | OP Code | | | |

FIG.7B

MRW (DDR5)

| Function | CS_n | CA Pins | | | | | | |
|---|---|---|---|---|---|---|---|---|
| | | CA0 | CA1 | CA2 | CA3 | CA4 | CA5 | CA6 |
| MRW | L | H | L | H | L | L | MRA0 | MRA1 |
| | | CA7 | CA8 | CA9 | CA10 | CA11 | CA12 | CA13 |
| | | MRA2 | MRA3 | MRA4 | MRA5 | MRA6 | MRA7 | V |
| | | CA0 | CA1 | CA2 | CA3 | CA4 | CA5 | CA6 |
| | H | OP0 | OP1 | OP2 | OP3 | OP4 | OP5 | OP6 |
| | | CA7 | CA8 | CA9 | CA10 | CA11 | CA12 | CA13 |
| | | OP7 | V | V | CW | V | V | V |

FIG.7C

MRW

| Function | Register Type | CA | Data | |
|---|---|---|---|---|
| Write Size (64byte*n) | W | CA[9:4] (6bit) | 000000 | 1 CL |
| | | | 000001 | 2 CL |
| | | | 000010 | 3 CL |
| | | | 000011 | 4 CL |
| | | | 000100 | 5 CL |
| | | | ... | ... |
| | | | 111110 | 63 CL |
| | | | 111111 | 64 CL |

| Function | Register Type | CA | Data | |
|---|---|---|---|---|
| BG Toggle Mode | W or R/W | CA[3] (1bit) | 0 | Disable (tCCD_L) |
| | | | 1 | Enable (tCCD_S) |

FIG.8A

Write (DDR4)

| Function | Previous Cycle | Current Cycle | CS_n | ... | A17,A13 A11 | ... |
|---|---|---|---|---|---|---|
| Write (Fixed BL8 or BC4) | H | H | L | ... | V | ... |
| Write (BC4, on the Fly) | H | H | L | ... | V | ... |
| Write (BL8, on the Fly) | H | H | L | ... | V | ... |
| Write with Auto Precharge (Fixed BL8 or BC4) | H | H | L | ... | V | ... |
| Write with Auto Precharge (BC4, on the Fly) | H | H | L | ... | V | ... |
| Write with Auto Precharge (BL8, on the Fly) | H | H | L | ... | V | ... |

FIG.8B

Write(DDR5)

| function | CS_n | CA Pins | | | | | | | |
|---|---|---|---|---|---|---|---|---|---|
| | | CA0 | ... | CA9 | CA10 | CA11 | CA12 | ... |
| Write | L | H | ... | BG1 | BG2 | CID0 | CID1 | ... |
| | H | V | ... | V | H | WR_Partial=L | V | ... |
| Write with Auto precharge | L | H | ... | BG1 | BG2 | CID0 | CID1 | ... |
| | H | V | ... | V or DRFM=L | AP=L | WR_Partial=L | V | ... |

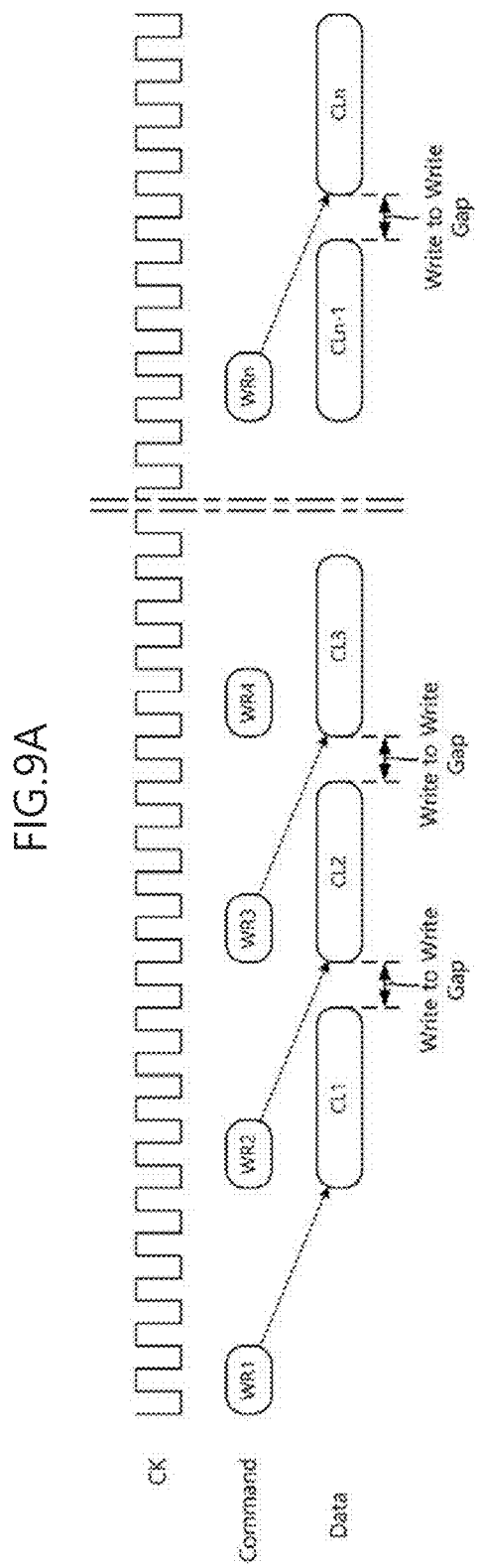

STORAGE MODULE SUPPORTING SINGLE SERIALIZED WRITE INTERFACING SCHEME AND OPERATION METHOD THEREOF

CROSS-REFERENCE TO RELATED APPLICATION

This application claims priority under 35 U.S.C. § 119 to Korean Patent Application No. 10-2022-0087193, filed on Jul. 14, 2022, in the Korean Intellectual Property Office, the disclosure of which being incorporated by reference herein in its entirety.

BACKGROUND

Embodiments of the present disclosure relate to a memory system, and more particularly, relate to a storage module capable of supporting a single serialized write interfacing scheme and an operating method thereof.

A double data rate synchronous dynamic random-access memory (DDR SDRAM) is a type of memory integrated circuit (IC) used in computers. The DDR SDRAM may achieve a faster transmission speed by using the timing control of electrical data and clock signals, and may transmit data on both the rising edge and the falling edge of a clock signal. Accordingly, the DDR SDRAM may effectively double a data bus bandwidth compared to an SDR SDRAM (single data rate synchronous dynamic random-access memory) interface using the same clock frequency.

When a write operation is performed, write data corresponding to a size of one cache line (hereinafter 'CL') may be transmitted in response to one write command on the DDR interface. For example, when the size of write data corresponding to a specific work load is the size of 'n' cache lines ('n' is an integer greater than or equal to '1'), to store the write data in the storage module, 'n' write command should be transmitted to the storage module. Accordingly, as the size of the write data increases, the number of write commands to be transmitted together also increases. This increase in the number of write commands causes an increase in a write to write gap on the data bus and additional consumption of the DDR clock due to this increase, and as a result, the increase in the number of write commands becomes a large factor in the degradation of the DDR interface performance.

SUMMARY

It is an aspect to provide a memory system capable of optimizing interface performance by preventing a write to write gap from occurring on a DDR interface.

According to an aspect of one or more embodiments, there is provided a method of operating a storage module, the method comprising setting a characteristic value based on information received from a host, the information including information related to a size of write data in units of a plurality of cache lines, and successively receiving the write data in units of the plurality of cache lines based on a single write command received from the host.

According to another aspect of one or more embodiments, there is provided a storage module comprising a memory device that includes a volatile memory, and a memory controller configured to control the memory device. The memory controller includes a control module configured to decode a setting command received from a host to identify information on a size of write data, and to determine a number of cache line unit data to be successively received from the host based on the size of the write data; and a register configured to store first information on the number of cache line unit data to be successively received.

According to yet another aspect of one or more embodiments, there is provided a memory system comprising a host configured to determine a number of cache lines to be write-requested, and a storage module configured to receive information related to the number of cache lines from the host, identify a number of cache line unit data to be successively received based on the information, and successively receive data in units of the plurality of cache lines based on a single write command.

BRIEF DESCRIPTION OF THE DRAWINGS

The above and other aspects will be described below with reference to the drawings, in which:

FIGS. 7A to 7C are diagrams illustrating an example of a mode register value set in a setting command, according to some embodiments;

FIGS. 8A and 8B are diagrams for describing an example of a transfer operation of a single write command in the flowchart of FIG. 4, according to some embodiments;

FIGS. 9A, 9B, and 10 are diagrams for describing a comparative example of reception and write operations;

DETAILED DESCRIPTION

Hereinafter, various embodiments will be described in detail and clearly to such an extent that an ordinary one in the art may easily implement the present disclosure.

Figure 1:
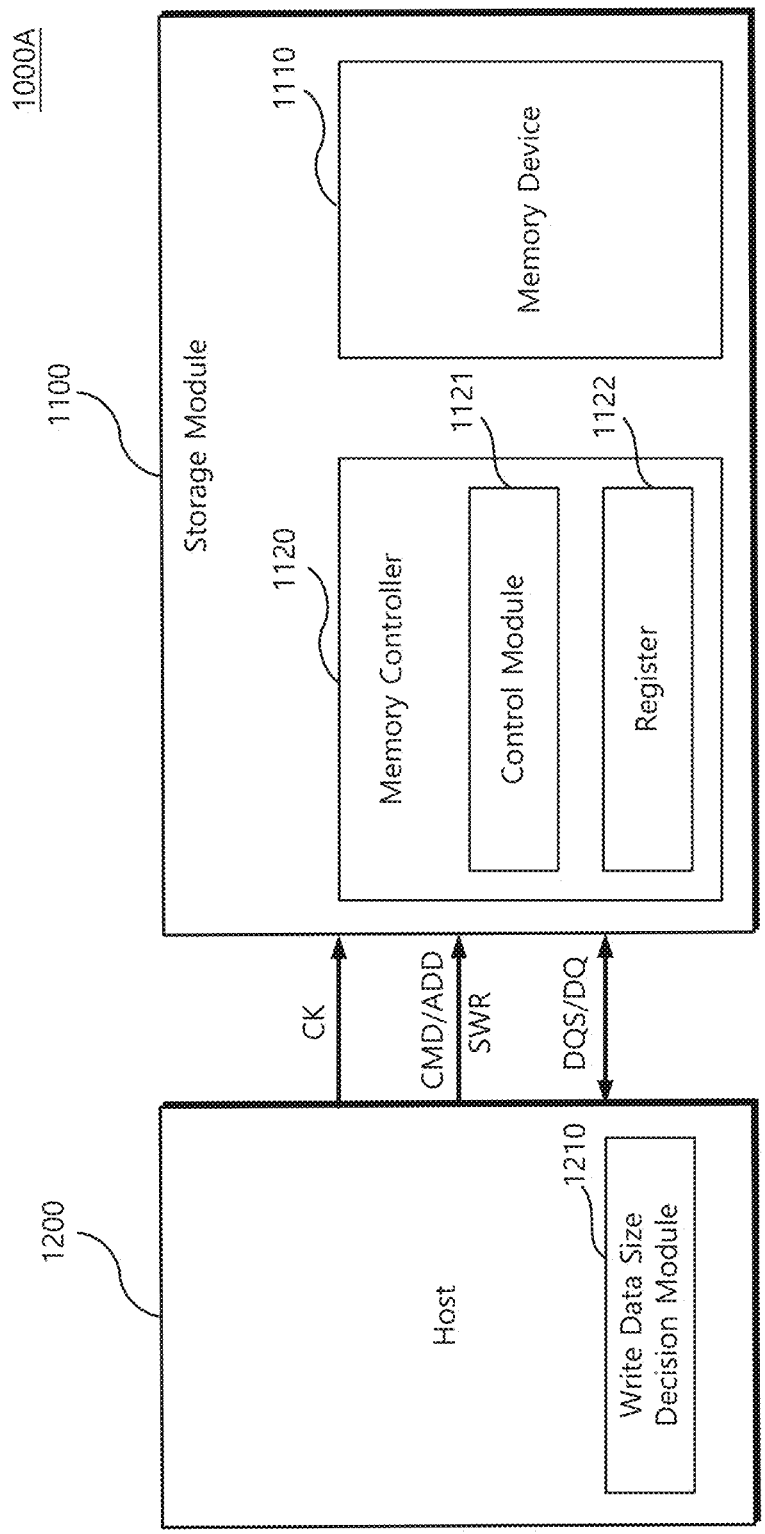
FIG. 1 is a block diagram illustrating an example of a memory system according to some embodiments.

FIG. 1 is a block diagram illustrating an example of a memory system 1000A according to some embodiments. Referring to FIG. 1, the memory system 1000A may include a storage module 1100 and a host 1200.

The memory system 1000A according to some embodiments may support a single serialized write interfacing scheme. In this case, the single serialized write interfacing scheme refers to an interfacing scheme in which write data are transmitted and received based on a single write command (hereinafter referred to as 'SWR'), wherein the write data include a number of CL unit data. By supporting a single serialized write interfacing scheme, the memory system 1000A may prevent the write to write gap from occurring. Accordingly, interface performance between the host 1200 and the storage module 1100 may be improved.

The storage module 1100 may communicate with the host 1200 and may write data or may read data in response to a request of the host 1200.

The storage module 1100 may receive data from the host 1200 according to the single serialized write interfacing scheme. For example, the storage module 1100 may receive a single write command and write data corresponding thereto from the host 1200. In this case, the write data may include 'n' data in units of the cache lines 'CL' (here 'n' is an integer greater than or equal to '1').

The storage module 1100 may include a memory device 1110 and a memory controller 1120.

The memory device 1110 may include one or more volatile memories. For example, in some embodiments, the memory device 1110 may include a dynamic RAM (DRAM). In this case, the DRAM may be a clock synchronous DRAM such as a synchronous DRAM (SDRAM). For example, in some embodiments, the DRAM may be a synchronous DRAM (SDRAM), a double data rate SDRAM (DDR SDRAM), or a low power double data rate SDRAM (LPDDR SDRAM). In some embodiments, the memory device 1110 may include a volatile memory such as a RAMbus DRAM (RDRAM), a static RAM (SRAM), etc.

The memory controller 1120 may receive the single write command SWR and write data corresponding thereto from the host 1200. In this case, the single write command SWR refers to one command requesting to write the write data in the storage module 1100, and the write data requested to be written according to the single write command SWR may include a number of CL unit data.

For example, when an application of the host 1200 implements a work load in the form of a column stride, the write data may include a number of CL unit data. In this case, a write request may be performed by the single write command SWR. For example, when the memory system 1000A supports a function of a memory copy, a memory move, or a copy-on-move, the write data may include a series of data in units of the cache lines CL.

The memory controller 1120 may receive a series of data in units of a plurality of cache lines CL in response to the single write command SWR, and may control the memory device 1110 to perform a write operation thereon.

The memory controller 1120 may include a control module 1121 and a register 1122.

The control module 1121 may exchange commands and/or data with the host 1200. For example, the control module 1121 may exchange data with the host 1200 through various interface methods such as an Advanced Technology Attachment (ATA), a Serial ATA (SATA), an external SATA (e-SATA), a Small Computer Small Interface (SCSI), a Serial Attached SCSI (SAS), a Peripheral Component Interconnection (PCI), a PCI express (PCIe), an NVM express (NVMe), an IEEE 1394, a universal serial bus (USB), a secure digital (SD) card, a multi-media card (MMC), an embedded multi-media card (eMMC), a Universal Flash Storage (UFS), an embedded Universal Flash Storage (eUFS), and/or a compact flash (CF) card.

The control module 1121 may receive information on the size of write data from the host 1200. For example, the control module 1121 may receive a setting command, such as a mode register set (MRS) command or a mode register write (MRW) command, and may decode the setting command to identify the size of write data. The control module 1121 may identify the number of CL unit data to be successively received thereafter, based on the identified size of the write data. For example, the control module 1121 may identify the number of CL unit data to be received by dividing the size of write data by the size of the cache line CL.

In some embodiments, the control module 1121 may receive toggle mode information on whether to successively perform a write operation on a same bank group or a write operation on different bank groups of a plurality of bank groups from the host 1200. The control module 1121 may receive write data using a pulse width corresponding to a first time tCCD_L or a pulse width corresponding to a second time tCCD_S, based on the toggle mode information. The first time tCCD_L may correspond to a time of the same bank group, and the second time tCCD_S may correspond to a time of the different bank groups. For example, the first time tCCD_L refers to a time for receiving data of the same bank group after receiving data of the selected bank group, and the second time tCCD_S refers to a time for receiving data of the different bank group after receiving data of the selected bank group. In other words, the control module 1121 may receive data for a selected bank group of the plurality of bank groups, and then receive data at the first time for writing to the same bank group as the selected bank group, or receive data at the second time for writing to a different bank group from the selected bank group.

The register 1122 may store information related to the single serialized write interfacing scheme. For example, the register 1122 may store information on the number of CL unit data to be successively received. The register 1122 may store the toggle mode information.

Continuing to refer to FIG. 1, in some embodiments, the host 1200 may control the overall operation of the memory system 1000A. In some embodiments, the host 1200 may be implemented as an application processor (AP). In some embodiments, the host 1200 may execute a program according to an application supported by the memory system 1000A and may transmit a result of the program execution to the storage module 1100. The host 1200 may include various intellectual properties (IPs). For example, the host 1200 may include a CPU core, a cache memory, or a double data rate (DDR) physical layer.

The host 1200 may determine an appropriate size of write data according to a work load, and may transmit the single write command SWR to the storage module 1100 such that the write data may be written to the storage module 1100. In some embodiments, the host 1200 may output write data having sizes corresponding to the plurality of cache lines CL according to an application as a program execution result, and may transmit the single write command SWR to the storage module 1100 such that the write data may be written to the storage module 1100.

The host 1200 may include a write data size decision module 1210.

According to an embodiment, the write data size decision module 1210 may determine a size of write data to be requested using the single write command SWR to be written at one time. For example, the write data size decision module 1210 may determine an appropriate size of the write data according to a work load. In a DDR interface, data may be transmitted from the host 1200 to the storage module 1100 in units of the cache lines CL. In this case, the write data size decision module 1210 may determine an appropriate size of write data according to the work load, and may determine the number of CL unit data to be requested using the single write command SWR to be written at one time, based on the size of the write data.

According to an embodiment, the write data size decision module 1210 may identify the size of data output as a result of program execution, and may determine a size of write data to be transmitted using to the single write command SWR. For example, the write data size decision module 1210 may divide write data output as a result of the program execution in units of the cache lines CL, such that the number of CL unit data to be transmitted according to the single write command SWR may be determined.

As described above, the memory system 1000A according to some embodiments may support the single serialized write interfacing scheme. Accordingly, generation of a write to write gap may be prevented, and interface performance may be improved with efficient use of the command bus.

Figure 2:
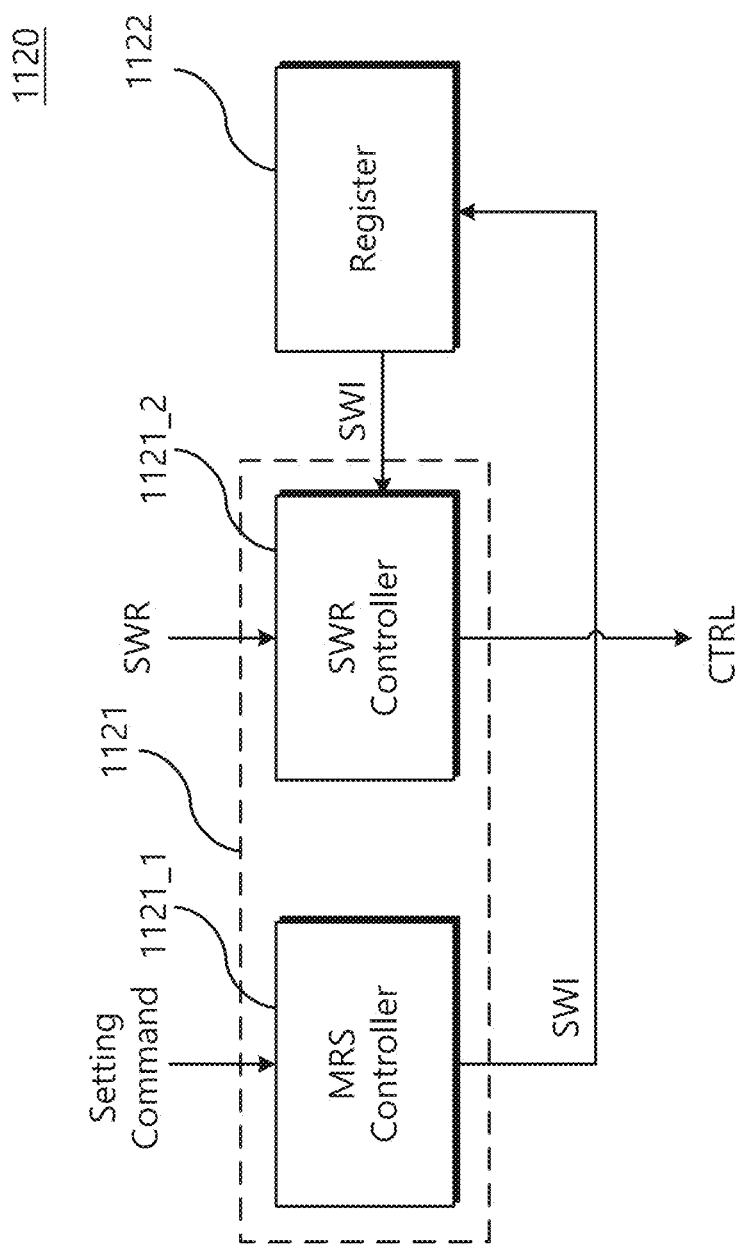
FIG. 2 is a block diagram illustrating an example of a memory controller of the memory system of FIG. 1, according to some embodiments.

FIG. 2 is a block diagram illustrating an example of the memory controller 1120 of FIG. 1, according to some embodiments. Referring to FIG. 2, the memory controller 1120 may include the control module 1121 and the register 1122, and the control module 1121 may include an MRS controller 1121_1 and an SWR controller 1121_2.

The MRS controller 1121_1 may receive a setting command related to a single serialized write interfacing scheme from the host 1200. The MRS controller 1121_1 may decode the setting command and may identify information on write data corresponding to the single write command SWR to be received later.

In an embodiment, the MRS controller 1121_1 may decode the setting command to identify the number of CL (cache line) unit data (hereinafter, referred to as 'NCD') to be successively received. For example, when the size of the cache line CL is 64 bytes and the size of write data is 640 bytes, the MRS controller 1121_1 may identify that data in units of 10 cache lines CL will be received, in response to the single write command. The MRS controller 1121_1 may store, in the register 1122, information on the number of CL unit data NCD to be successively received.

According to an embodiment, the MRS controller 1121_1 may decode the setting command and may identify a toggle mode TM with respect to write data to be received. For example, when the toggle mode is enabled, the MRS controller 1121_1 may identify that write data associated with different bank groups will be received, and may receive the write data based on the second time tCCD_S. As another example, when the toggle mode is disabled, the MRS controller 1121_1 may identify that write data associated with the same bank group will be received, and may receive the write data based on the first time tCCD_L. The MRS controller 1121_1 may store information on the toggle mode TM and/or a time tCCD in the register 1122.

The setting command may take any form as long as the setting command is a signal for setting a mode register associated with a single serialized write interfacing scheme. For example, the setting command may be a Mode Register Set (MRS) command in a DDR4 or a Mode Register Write (MRW) command in a DDR5.

Continuing to refer to FIG. 2, the SWR controller 1121_2 may receive the single write command SWR from the host 1200. The SWR controller 1121_2 may receive serialized write information (hereinafter 'SWI') from the register 1122. In this case, the serialized write information SWI may include information on the number of CL unit data NCD to be successively received, the toggle mode TM, and/or the time tCCD. The SWR controller 1121_2 may output a control signal CTRL for controlling a write operation with respect to the memory device 1110 based on the serialized write information SWI.

Figure 3:
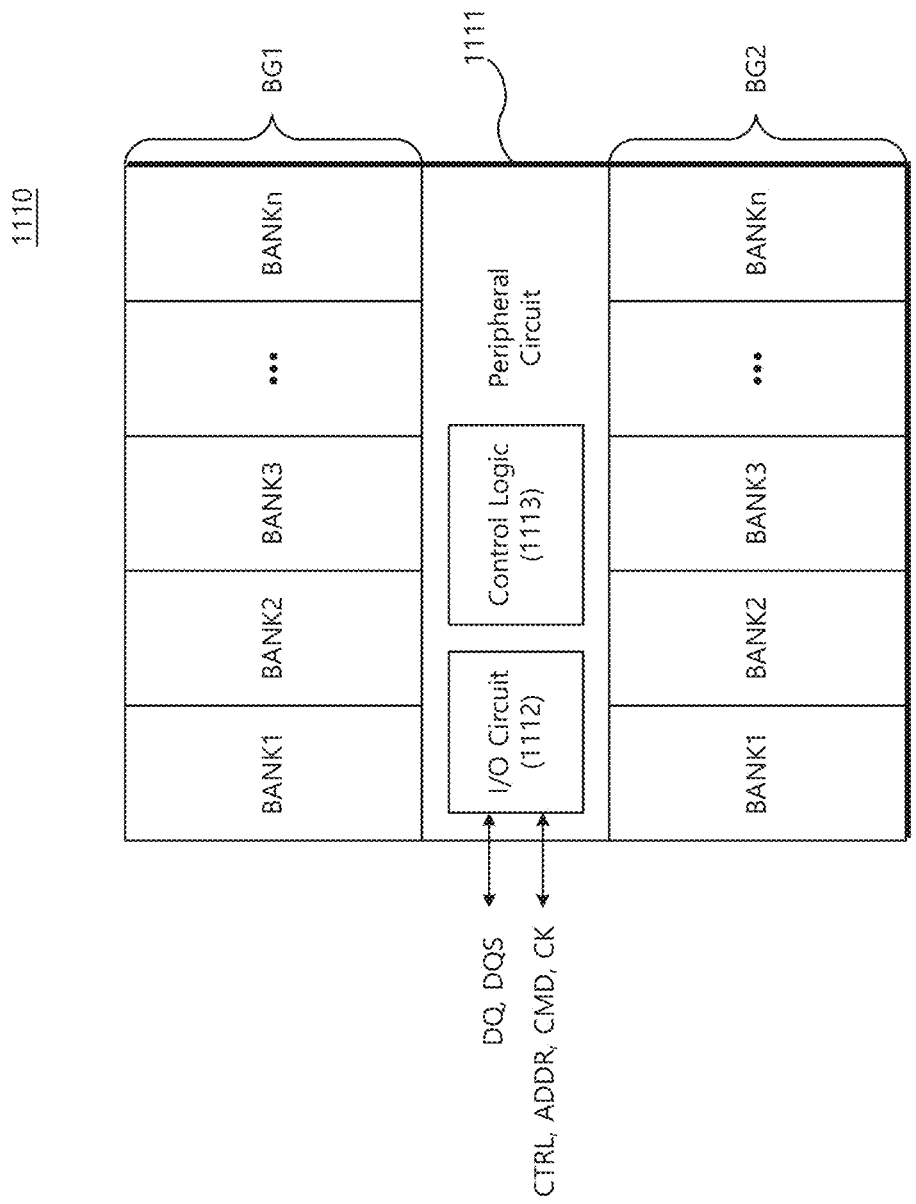
FIG. 3 is a block diagram illustrating an example of a memory device of the memory system of FIG. 1.

FIG. 3 is a block diagram illustrating an example of the memory device 1110 of FIG. 1, according to some embodiments.

Referring to FIG. 3, the memory device 1110 may include a plurality of bank groups. For example, the memory device 1110 may include a first bank group BG1 and a second bank group BG2. Each of the first bank group BG1 and the second bank group BG2 may include first to n-th banks BANK1 to BANKn. The first to n-th banks BANK1 to BANKn of the first bank group BG1 and the second bank group BG2 may each have the same structures and may operate in the same manner.

Each of the first to n-th banks BANK1 to BANKn may include memory cells. Memory cells may be used to store data transferred from the host 1200. For example, the memory cells may be volatile memory cells such as a DRAM, an SDRAM, a DDR SDRAM, an LPDDR SDRAM, an RDRAM, an SRAM, etc.

The memory device 1110 may further include a peripheral circuit 1111. The peripheral circuit 1111 may receive a command CMD, an address ADDR, and a clock signal CK from the host 1200. The peripheral circuit 1111 may select a bank indicated by the address ADDR from among the first to n-th banks BANK1 to BANKn of the first bank group BG1 and the second bank group BG2. The peripheral circuit 1111 may allow the selected bank to perform an operation indicated by the command CMD, for example, a write operation or a read operation, with respect to memory cells indicated by the address ADDR among the memory cells of the selected bank.

The peripheral circuit 1111 may include an input and output (I/O) circuit 1112 that exchanges data signals DQ and data strobe signals DQS with the host 1200. The data strobe signals DQS may be used to transfer timings to latch the data signals DQ. In some embodiments, the peripheral circuit 1111 may further include control logic 1113 that controls the selected bank in response to the command CMD, the address ADDR, and/or the clock signal CK.

In some embodiments, the peripheral circuit 1111 may receive the control signal CTRL from the SWR controller 1121_2. The peripheral circuit 1111 may control the memory device 1110 to perform a write operation in response to the control signal CTRL.

In more detail, when the single write command SWR is received from the host 1200, the SWR controller 1121_2 (refer to FIG. 2) may generate the control signal CTRL for controlling a write operation on the memory device 1110 based on the serialized write information SWI stored in the register 1122 (refer to FIG. 2), and may transfer the control signal CTRL to the peripheral circuit 1111.

For example, when the toggle mode is enabled, the data in units of the cache lines CL for each of the first bank group BG1 and the second bank group BG2 may be alternately received at an interval of the second time tCCD_S. In this case, the peripheral circuit 1111 may store the data for the first bank group BG1 in the data buffer of the first bank group BG1 in response to the control signal CTRL, and may store the data for the second bank group BG2 in the data buffer of the second bank group BG2 in response to the control signal CTRL.

As another example, when the toggle mode is disabled, data in units of the cache lines CL for a same bank group of the plurality of bank groups may be successively received at an interval of the first time tCCD_L. In this case, the peripheral circuit 1111 may store write data in the data buffer of the selected bank group in response to the control signal CTRL.

As described in FIGS. 1 to 3, the memory system 1000A according to some embodiments may support the single serialized write interfacing scheme, and the single write command SWR may be transferred from the host 1200 to the storage module 1100 only once. That is, when data are transferred in units of the cache lines CL on the DDR interface, even though data in units of cache lines CL corresponding to a specific workload are transmitted from the host 1200 to the storage module 1100 a plurality of times, a write command corresponding thereto may be transmitted only once. Accordingly, occurrence of a write to write gap caused by transferring a plurality of write commands is prevented, such that interface performance may be improved. Since it is not necessary to generate the plurality of write commands, power consumption due to this may be minimized.

In FIGS. 1 to 3, it is assumed that a unit of data transmission is a unit of cache lines CL. However, this is only an example, and according to an embodiment, the unit of data transmission may be changed, and in some embodiments, the unit of the cache lines CL may also be changed. For example, a unit of the cache lines CL such as 32 bytes, 64 bytes, 128 bytes, etc. may be used as a unit of data transmission, and a unit of a specific size may be applied.

In some embodiments, performing a write operation in units of the cache lines CL or the specific size may be referred to as a burst write, and as illustrated in FIGS. 1 to 3, a write request for data in units of the plurality of cache lines CL by the single write command SWR and a series of write operations resulting therefrom are also referred to as a burst write request and a burst write operation, respectively.

Hereinafter, the operation of the memory system 1000A according to some embodiments will be described in more detail.

Figure 4:
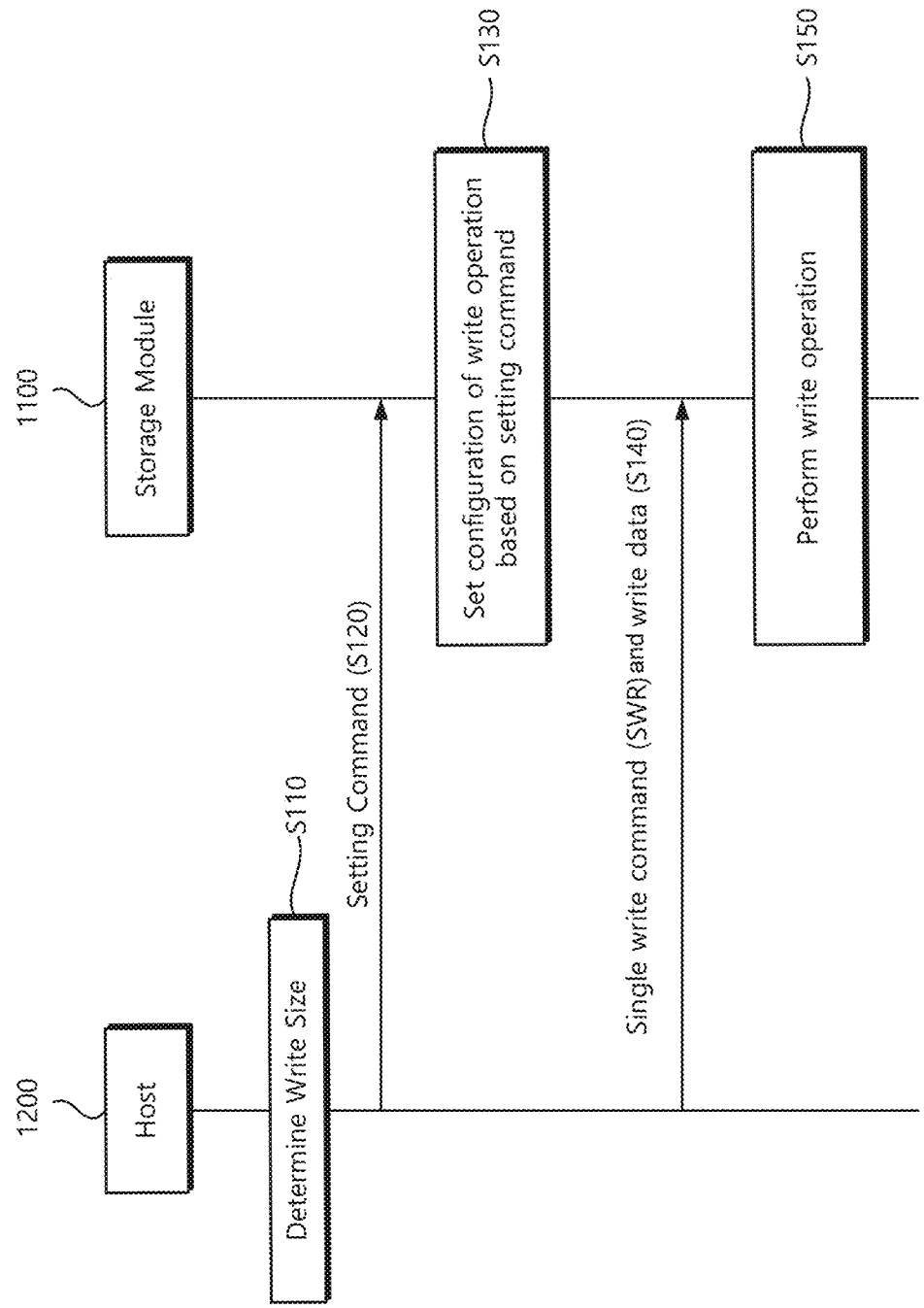
FIG. 4 is a flowchart illustrating an example of an operation of the memory system of FIG. 1, according to some embodiments.

FIG. 4 is a flowchart illustrating an example of an operation of the memory system 1000A of FIG. 1, according to some embodiments.

In operation S110, the host 1200 may determine a write size. For example, the host 1200 may determine the size of write data to be transmitted through the single serialized interfacing scheme. For example, when a burst write mode supporting a write operation in units of the cache lines CL is supported, the host 1200 may determine the number of cache lines CL to be transmitted through the single serialized interfacing scheme to determine the size of write data.

In operation S120, the host 1200 may transfer a setting command to the storage module 1100. For example, the host 1200 may determine a mode register value based on the determined number of cache lines CL, and may transfer the setting command including the determined mode register value to the storage module 1100 through a command bus (hereinafter, referred to as 'CMD bus'). For example, the setting command may be an MRS command of a DDR4 or an MRW command of a DDR5.

In operation S130, the storage module 1100 may set a configuration of a single serialized write operation based on the setting command. For example, the storage module 1100 may decode the mode register value and may set a characteristic value associated with write data to be received through the single serialized interfacing scheme based on the decoded mode register value. For example, the storage module 1100 may decode the mode register value to identify information on the number of CL unit data NCD to be successively received, the toggle mode TM, and/or the time tCCD, and may set the characteristic value with respect to the information. Information on the number of CL unit data NCD to be successively received, the toggle mode TM, and/or the time tCCD may be stored in the register 1122 (refer to FIG. 3).

In operation S140, the host 1200 may transfer the single write command SWR and write data to the storage module 1100. For example, the host 1200 may transfer the single write command SWR and the write data to the storage module 1100 through the CMD bus. In this case, the single write command SWR and the write data may be transferred through the single serialized write interfacing scheme.

In an embodiment, the single write command SWR may be implemented using only one bit. In some embodiments, the single write command SWR may be transmitted to the storage module 1100 only once regardless of the number of cache lines CL determined by the host 1200.

In operation S150, the storage module 1100 may perform a write operation. For example, the storage module 1100 may perform a write operation of writing the received write data in the memory device 1110 (refer to FIG. 1). In an embodiment, the storage module 1100 may perform a write operation on the different bank groups or a write operation on the same bank group, based on the toggle mode TM. In this case, the write operation for each bank group may be performed in a column stride scheme.

Figure 5:
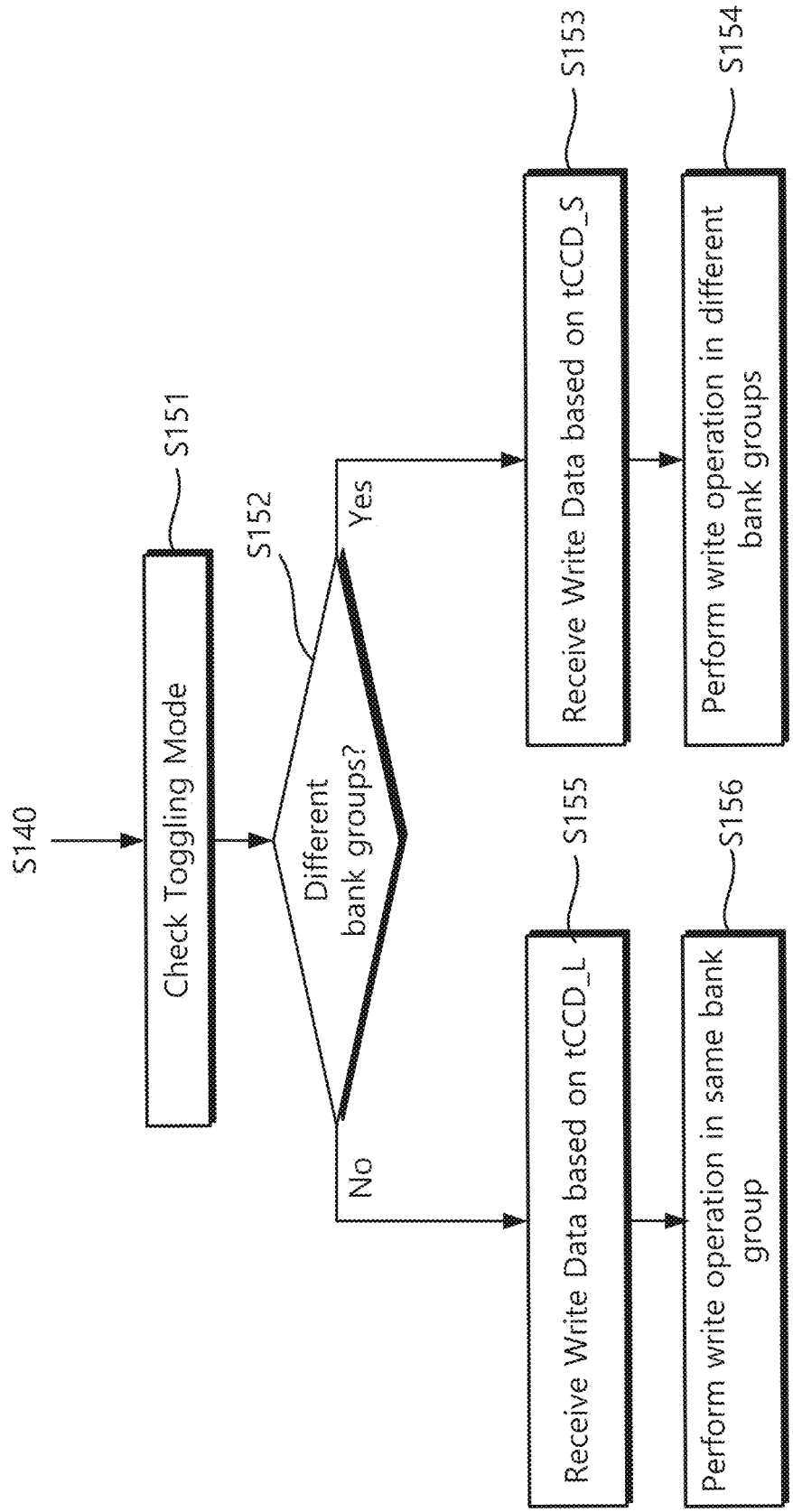
FIG. 5 is a flowchart illustrating an example of a write operation in the flowchart of FIG. 4, according to some embodiments.

FIG. 5 is a flowchart illustrating an example of a write operation in operation S150 of FIG. 4, according to some embodiments.

In operation S151, the storage module 1100 may identify the toggle mode TM.

In operation S152, the storage module 1100 determines whether the data for which the write operation is requested is for different bank groups.

When the toggle mode TM is enabled, the storage module 1100 may perform a write operation on different bank groups (S152, Yes). Specifically, in operation S153, the storage module 1100 may receive data for different bank groups based on a pulse width corresponding to the second time tCCD_S. Thereafter, in operation S154, the storage module 1100 may perform a write operation on different bank groups. In this case, the write operation may be alternately performed with respect to different bank groups. Also, a write order for each bank group may be performed in a column stride scheme.

When the toggle mode TM is disabled, the storage module 1100 may perform a write operation on the same bank group (S152, No). Specifically, in operation S155, the storage module 1100 may receive data for the same bank group based on a pulse width corresponding to the first time tCCD_L longer than the second time tCCD_S. Thereafter, in operation S156, the storage module 1100 may perform a write operation on the same bank group. In this case, the write order for the selected same bank groups may be performed in the column stride scheme.

As described in FIGS. 4 and 5, the memory system 1000A according to some embodiments may perform a series of write operations with respect to data corresponding to 'n' cache lines CL based on the single write command SWR. In general, for a write operation on data corresponding to 'n' cache lines CL, a host should transfer 'n' write commands to the storage module through the CMD bus. In contrast, the memory system 1000A according to some embodiments may request a write operation associated with data corresponding to the 'n' cache lines CL to the storage module using the single write command SWR. Accordingly, since it is not necessary to use a plurality of write commands, the use efficiency of the CMD bus may be increased. Also, the power required may be reduced as the reduction in the number of commands is achieved. In some embodiments, occurrence of a write to write gap may be prevented, so that interface performance may be improved.

Figure 6:
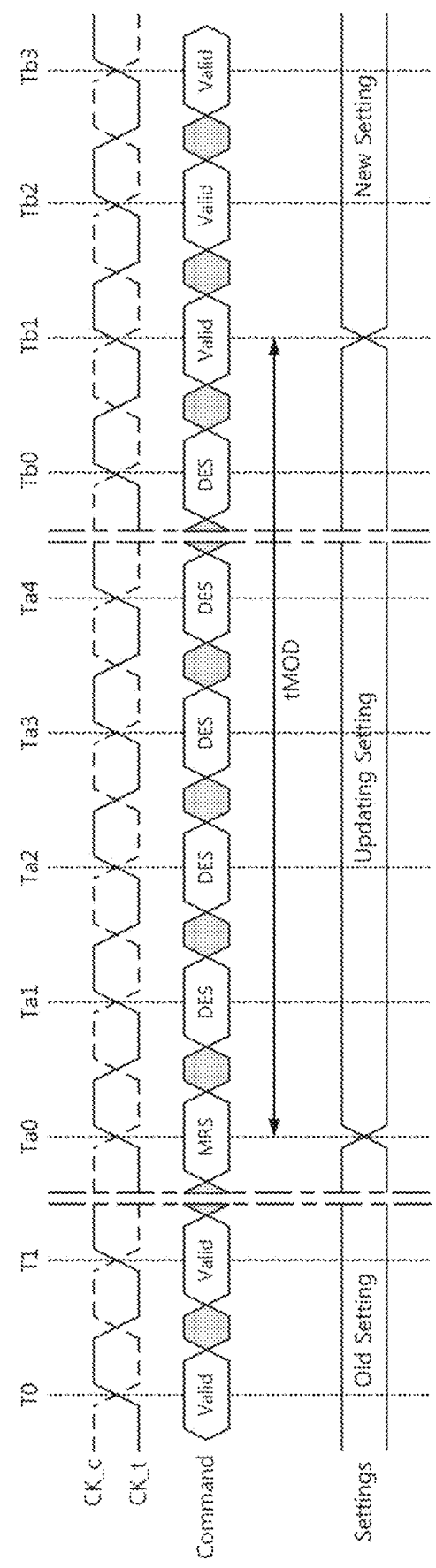
FIG. 6 is a timing diagram illustrating an example of an operation of transferring a setting command, according to some embodiments.

FIGS. 6 and FIGS. 7A and 7B are diagrams for describing a setting command transfer and setting operation in operations S120 and S130 of FIG. 5, according to some embodiments. In detail, FIG. 6 is a timing diagram illustrating an example of an operation of transferring and setting a setting command, and FIGS. 7A and 7B are diagrams illustrating an example of a mode register value set in a setting command.

Referring to FIG. 6, times T0 to Ta0 may be in an old setting state.

At the time Ta0, the host 1200 may provide the setting command MRS to the storage module 1100. For example, in the DDR4, when all banks are in an idle state, the host 1200 may provide the setting command MRS to the storage module 1100.

At times Ta0 to Tb1, the host 1200 will not provide a non-setting command. In this case, the non-setting command may refer to a command other than the setting command MRS, for example, active/read/write commands. Such times Ta0 to Tb1 may be referred to as an update delay time tMOD. During the update delay time tMOD, the storage module 1100 may decode the setting command MRS and may set a characteristic value according to a single serialized write interfacing scheme.

Thereafter, after the time Tb1, the storage module 1100 may receive the non-setting command.

In some embodiments, although not illustrated separately, the mode register setting process of the DDR5 may be performed similarly to the above description. For example, when all banks are in an idle state during a normal operation, the host 1200 may provide the setting command MRW to the storage module 1100. The host 1200 will not provide the non-setting command to the storage module 1100 during the update delay time tMOD. During the update delay time tMOD, the storage module 1100 sets a characteristic value according to the single serialized write interfacing scheme. After the update delay time tMOD is elapsed, the storage module 1100 may receive the non-setting command.

In FIG. 7A, when the setting command is the MRS command of the DDR4, each of signals (CKE, CS_n, RAS_n, CAS_n, WE_n, BG0 and BG1, BA0 and BA1, C2 to C0, A12, A17, A14, A11, A10, A0 to A9, etc.) is illustrated. In this case, 'H' denotes logic high, 'L' denotes logic low, 'BG' denotes a bank group address, 'BA' denotes a bank address, 'X' denotes logic defined as 'H' or 'L', or that logic does not need to be defined (i.e., don't care) like floating, and 'V' denotes a logic level defined as 'H' or 'L'. An OP code may indicate an operating code.

In FIG. 7B, when the setting command is the MRW command of the DDR5, the logical values of the respective signals CS_n and CA0 to CA13 of the MRW command are illustrated. In this case, 'H' denotes logic high, 'L' denotes logic low, MRA0 to MRA7 denotes a mode register address, and 'V' denotes a logic level defined as 'H' or 'L'. Also, OP0 to OP7 denotes an operating code.

Referring to FIGS. 7A and 7B, for example, by using the operating code 'OP code' of the MRS command of the DDR4 or the operating code OP0 to OP7 of the MRW command of the DDR5, information related to the single serialized write interfacing scheme may be indicated. In some embodiments, by additionally using don't care pins such as C2 to C0 pins of the DDR4 or CA8 and CA9 of the DDR5, information related to the single serialized write interfacing scheme may be indicated.

Referring to FIG. 7C, the MRW command of the DDR5 is illustrated as an example. For example, information related to the single serialized write interfacing scheme may be indicated using the CA3 to CA9 pins.

For example, CA[9:4] may indicate the number of cache lines CL determined by the host 1200. The number of cache lines CL may vary according to data (000000 to 111111) described in CA[9:4]. For example, when the storage module 1100 supports the burst write operation in units of the cache lines CL, data (000000 to 111111) described in CA[9:4] may correspond to the number of CL unit data to be transmitted to the storage module 1100 from the host 1200.

As an example, CA[3] may indicate the toggle mode TM. For example, when the data of CA[3] is '1', the toggle mode TM may be enabled. In this case, the storage module 1100 may receive data associated with different bank groups at an interval of the second time tCCD_S. As another example, when the data of CA[3] is '0', the toggle mode TM may be disabled. In this case, the storage module 1100 may receive data associated with the same bank group at an interval of the first time tCCD_L.

FIGS. 8A and 8B are diagrams for describing an example of a transfer operation of the single write command SWR in operation S140, according to some embodiments.

In FIG. 8A, when the command is a write command of the DDR4, logic values of respective signals (CAS_n, A17, A13, A11, etc.) of the write command are illustrated. In this case, 'H' denotes logic high, 'L' denotes logic low, and 'X' denotes logic defined as 'H' or 'L', or that logic does not need to be defined (i.e., don't care) like floating.

As illustrated in FIG. 8A, signals A17, A13, and A11 may not be defined in the DDR4. In some embodiments, the single write command SWR may be transmitted using any one of the undefined A17, A13, and A11 signals. For example, the single write command SWR may be transmitted using A17 signal having 1-bit. Since the single write command SWR uses only one bit, the overhead of the CMD bus may be minimized.

In FIG. 8A, when the command is a write command of the DDR5, logic values of respective signals (CS_n, CA0 to CA12, etc.) of the write command are illustrated.

As illustrated in FIG. 8B, signals CA9, CA11, and CA13 may not be defined in the DDR5. In some embodiments, the single write command SWR may be indicated using any one of the undefined CA9, CA11, and CA13 signals. Since the single write command SWR uses only 1-bit, even when the memory system 1000A supports the DDR5, the overhead of the CMD bus may also be minimized.

Figure 9B:
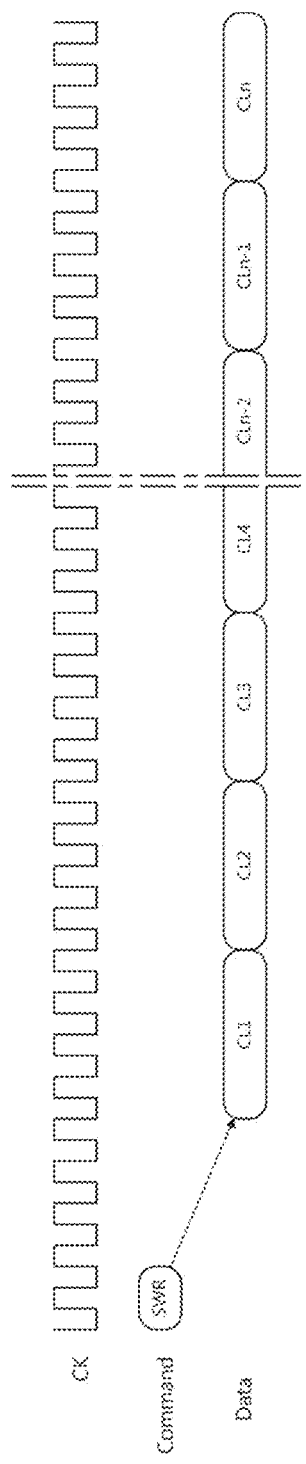
Figure 10:
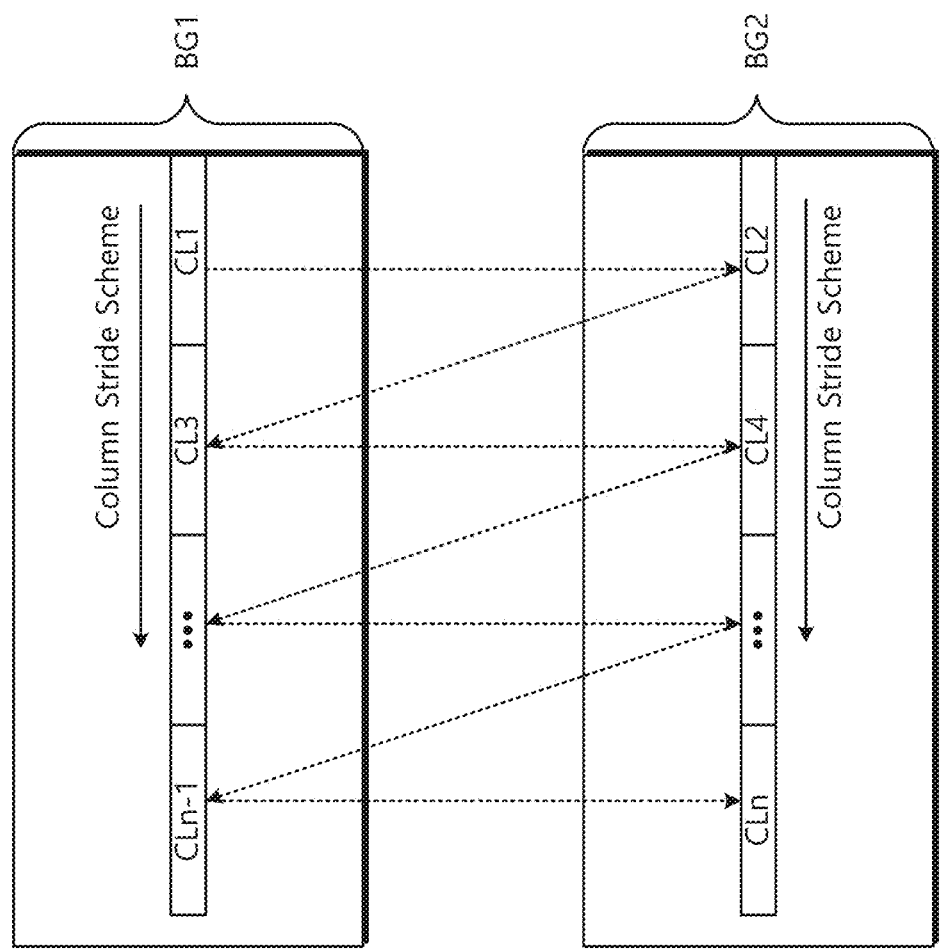

FIGS. 9A, 9B and 10 are diagrams for describing a comparative example of reception and write operations. In detail, FIG. 9A illustrates a timing diagram with respect to a related art DDR interfacing scheme, and FIG. 9B illustrates a timing diagram with respect to a single serialized write interfacing scheme according to some embodiments by way of example. FIG. 10 illustrates a write operation with respect to different bank groups according to some embodiments by way of example.

As illustrated in FIG. 9A, according to the related art DDR interfacing scheme, a plurality of write commands WR should be transmitted to request a write for data in units of the plurality of cache lines CL. For example, the host transmits 'n' write commands to the storage module to request a write for data in units of 'n' cache lines CL. In this case, a gap or a timing bubble may exist between adjacent data corresponding to adjacent write commands. For example, the write to write gap occurs between data of the first cache line CL1 corresponding to the first write command WR1 and data of the second cache line CL2 corresponding to the second write command WR2. Such a write to write gap not only consumes a DDR clock of the storage module unnecessarily, but also degrades the interface performance.

The single serialized write interfacing scheme according to some embodiments may be performed based on the single write command SWR as illustrated in FIG. 9B. Accordingly, the occurrence of the write to write gap due to a plurality of write commands is prevented, and consequently, unnecessary consumption of the DDR clock and deterioration of interface performance may be prevented. Since only one command SWR is transferred through the CMD bus, loss of the command bus on the interface may also be prevented. Since only one command SWR is generated without the need to generate a plurality of write commands, overall power consumption may be reduced.

Referring to FIG. 10, in response to the single write command SWR, write operations for different bank groups may be performed. For example, when the toggle mode TM is enabled, data for different bank groups are received at an interval of the second time tCCD_S, and a write operation in which the received data are alternately stored in different bank groups may be performed. When data in units of 'n' cache lines CL are received, the data of the first cache line CL1 may be stored in the first bank group BG1, and then the data of the second cache line CL2 may be stored in the second bank group BG2. In this way, data of the first to n-th cache lines CL1 to CLn may be alternately stored in the first bank group BG1 and the second bank group BG2.

A write operation for each bank group may be performed in a column stride scheme. For example, when a write operation on the first bank group BG1 or the second bank group BG2 is performed, the write operation may be sequentially performed in one direction from left to right.

According to some embodiments, a write operation for each bank group may be performed using data of different sizes. For example, data to be stored in the first bank group BG1 may have a data size corresponding to two cache lines, and data to be stored in the second bank group BG2 may have a data size corresponding to one cache line. For example, data to be stored in the first bank group BG1 may have a data size corresponding to one cache line, and data to be stored in the second bank group BG2 may have a data size corresponding to half a cache line. In this case, dummy data having a data size corresponding to half cache line may be stored in the second bank group BG2.

The single serialized write interfacing scheme according to some embodiments may be implemented in various ways. Hereinafter, various implementations according to some embodiments will be described in more detail.

Figure 11A:
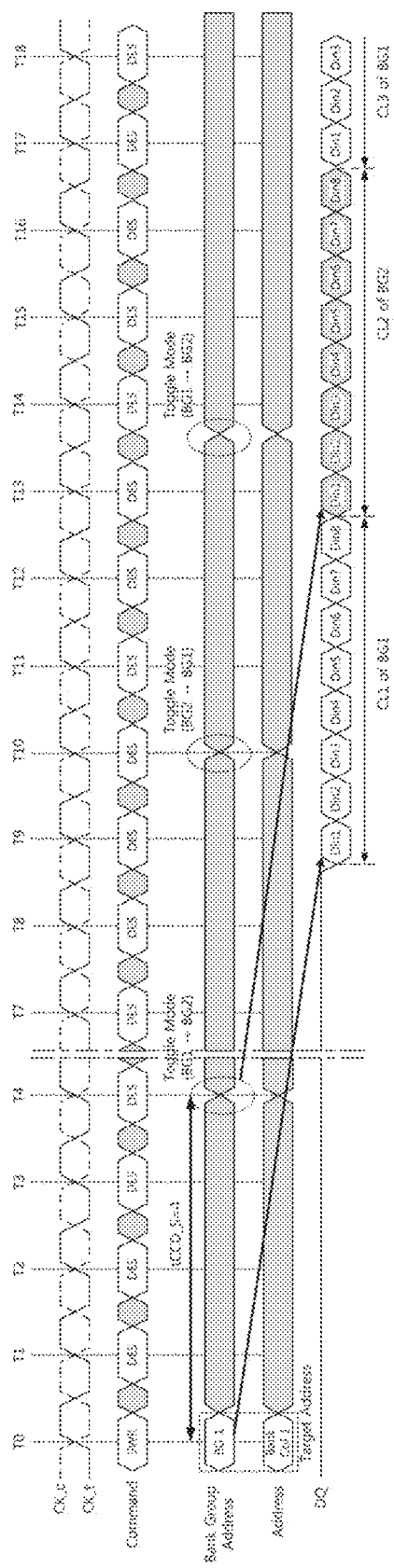
FIGS. 11A to 11F are diagrams illustrating various examples of a single serialized write interfacing scheme, according to some embodiments.

FIG. 11A is a diagram illustrating an example of a single serialized write interfacing scheme in which data corresponding to different bank groups are successively received, according to some embodiments. For example, in FIG. 11A, the DDR4 is supported, a burst length BL may be 8, the second time tCCD_S may be 4, and the write latency (hereinafter 'WL') may be 9. Meanwhile, although not illustrated, 1tCK or 2tCK may be applied to a preamble.

Referring to FIG. 11A, at time T0, the single write command SWR may be provided to the storage module 1100 (refer to FIG. 1) through the CMD bus from the host 1200 (see FIG. 1). In this case, a target address may be provided together. The target address may include an address associated with the target bank group and an address associated with the target bank. For example, the target bank group may be the first bank group BG1, and the target bank address may be a first bank column 'Bank Col1'.

Since the write latency WL is 9, data associated with the first bank group BG1 may be received at a time T9 when 9 clocks are elapsed from the time T0. In this case, the size of the received data may correspond to a burst length BL of 8. For example, the size of data of the burst length BL of 8 may correspond to the size of the cache line CL.

Since the second time tCCD_S is set to 4, a bank group in which a write operation is to be performed may be changed based on 4 clocks. For example, a bank group to which a write operation is to be performed may be changed from the first bank group BG1 to the second bank group BG2 at a time T4 when 4 clocks are elapsed from the time T0.

Since the write latency WL is 9, data associated with the second bank group BG2 may be received at the time T13 when 9 clocks are elapsed from the time T4. In this case, the size of the received data may correspond to the burst length BL of 8. In this way, data may be successively received from the first bank group BG1 and the second bank group BG2 in units of the cache lines CL.

In some embodiments, in each of the first bank group BG1 and the second bank group BG2, data may be stored in the column stride scheme. For example, during a write operation for each bank group, column addresses may be sequentially selected in one direction from left to right (or from right to left). Accordingly, an additional address other than the target address is not required, and as a result, interface performance may be improved.

Figure 11B:
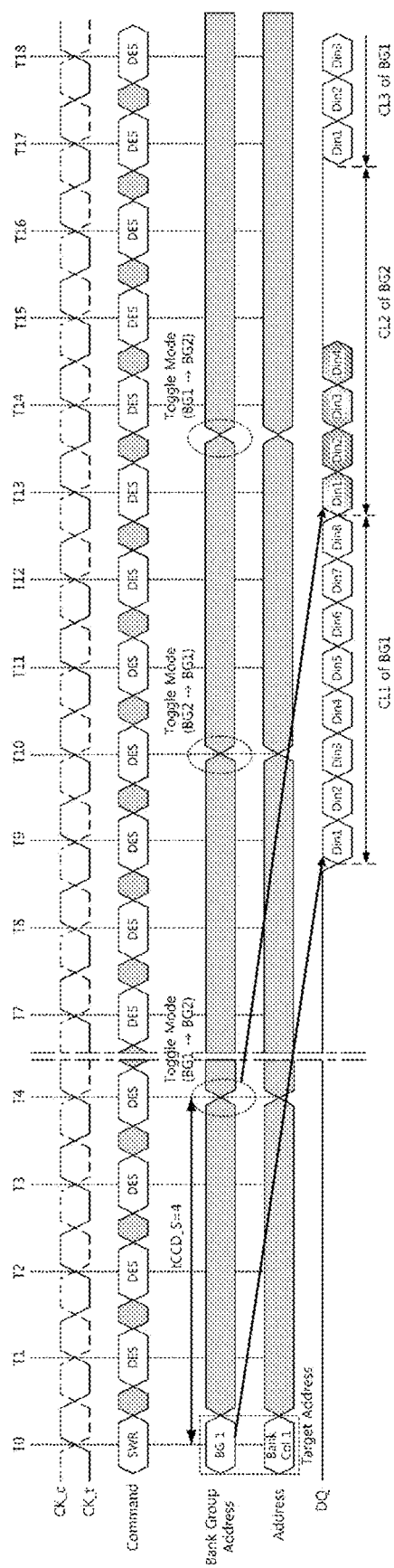

FIG. 11B is a diagram illustrating another example of a single serialized write interfacing scheme in which data corresponding to different bank groups are successively received, according to some embodiments. For example, in FIG. 11B, the DDR4 is supported, the burst length BL may be 8, the second time tCCD_S may be 4, and the write latency WL may be 9. Meanwhile, although not illustrated, 1tCK or 2tCK may be applied to the preamble. The interfacing method of FIG. 11A and the interfacing method of FIG. 11B are similar to each other. Therefore, for a brief description, additional description will be omitted below to avoid redundancy.

The single serialized write interfacing scheme of FIG. 11B may support On The Fly (OTF) mode. For example, data to be stored in the first bank group BG1 may have the burst length BL of 8, and data to be stored in the second bank group BG2 may have a burst chop BC of 4. For example, data associated with the first bank group BG1 may be received at times T9 to T12, and data associated with the second bank group BG2 may be received at times T13 to T14.

Since the write latency WL is 9 and the second time tCCD_S is set to 4, after data corresponding to the burst chop BC of 4 is received, data may not be received for a specific period of time or dummy data may be received. For example, data may not be received or dummy data may be received at times T15 to T17.

In this way, the single serialized write interfacing scheme according to some embodiments may support a Write (BL8) to Write (BC4) OTF mode with respect to different bank groups.

Figure 11C:
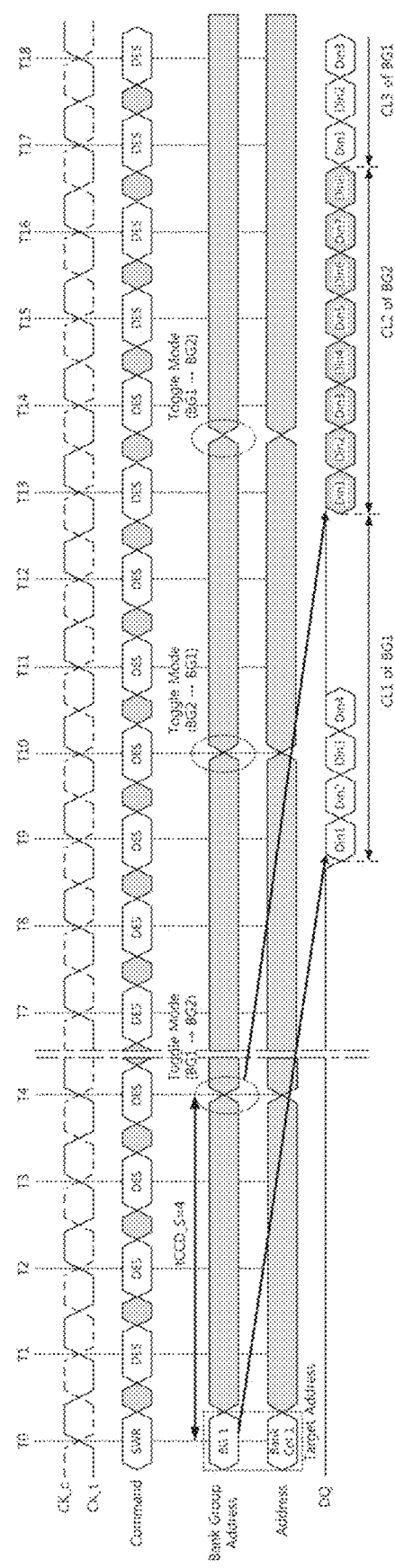

FIG. 11C is a diagram illustrating another example of a single serialized write interfacing scheme in which data corresponding to different bank groups are successively received, according to some embodiments. For example, in FIG. 11C, the DDR4 is supported, the burst length BL may be 8, the second time tCCD_S may be 4, and the write latency WL may be 9. In some embodiments, although not illustrated, 1tCK or 2tCK may be applied to a preamble. The interfacing method of FIG. 11C and the interfacing method of FIG. 11B are similar to each other. Therefore, for a brief description, additional description will be omitted below to avoid redundancy.

While the single serialized write interfacing scheme of FIG. 11B supports the Write (BL8) to Write (BC4) OTF mode, the single serialized write interfacing scheme of FIG. 11C may support a Write (BC4) to Write (BL8) OTF mode.

For example, data associated with the first bank group BG1 may be received at times T9 to T11, and data associated with the second bank group BG2 may be received at times T13 to T17. Also, data may not be received or dummy data may be received at times T11 to T13.

In this way, the single serialized write interfacing scheme according to some embodiments may also support the Write (BC4) to Write (BL8) OTF mode with respect to different bank groups.

Figure 11D:
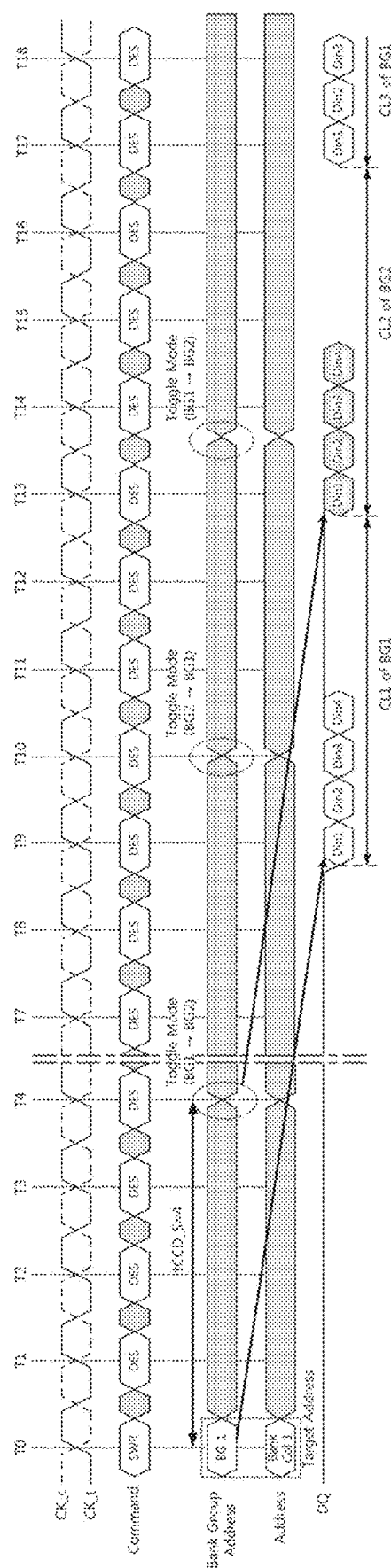

FIG. 11D is a diagram illustrating another example of a single serialized write interfacing scheme in which data corresponding to different bank groups are successively received, according to some embodiments. For example, in FIG. 11D, the DDR4 is supported, the burst chop BC may be 4, the second time tCCD_S may be 4, and the write latency WL may be 9. In some embodiments, although not illustrated, 1tCK or 2tCK may be applied to a preamble. The interfacing method of FIG. 11D is similar to the interfacing methods of FIGS. 11B and 11C. Therefore, for a brief description, additional description will be omitted below to avoid redundancy.

While the single serialized write interfacing scheme of FIGS. 11B and 11C supports the Write (BL8) to Write (BC4) OTF mode or the Write (BC4) to Write (BL8) OTF mode, the single serialized write interfacing scheme of FIG. 11D may support a Write (BC4) to Write (BC4) OTF mode.

For example, data associated with the first bank group BG1 may be received at times T9 to T11, and data associated with the second bank group BG2 may be received at times T13 to T15. Also, data may not be received or dummy data may be received at times T11 to T13 and at times T15 to T17.

In this way, the single serialized write interfacing scheme according to some embodiments may also support the Write (BC4) to Write (BC4) OTF mode with respect to different bank groups.

Figure 11E:
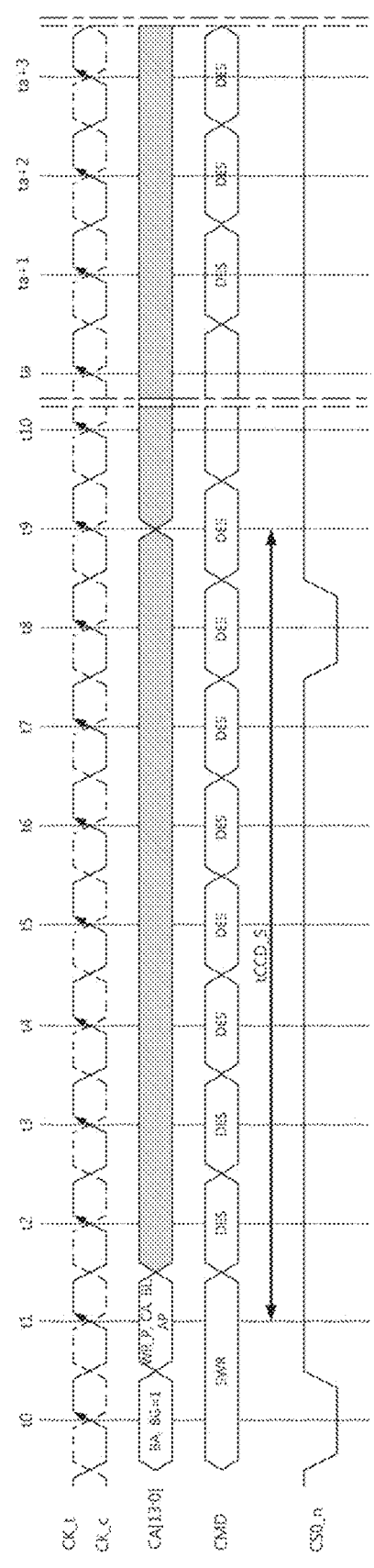

FIG. 11E is a diagram illustrating another example of a single serialized write interfacing scheme in which data corresponding to different bank groups are successively received, according to some embodiments. For example, in FIG. 11E, the DDR5 is supported, and the burst length BL may be 16. The single serialized write interfacing scheme of FIG. 11E and the single serialized write interfacing scheme of FIG. 11A are similar to each other. Therefore, for a brief description, additional description will be omitted below to avoid redundancy.

Referring to FIG. 11E, from time t0 to time t1, the single write command SWR may be provided to the storage module 1100 from the host 1200 through the CMD bus. In this case, at time t0, a target address may be provided together. The target address may include an address associated with the target bank group and an address associated with the target bank. Thereafter, when the write latency WL elapses, data to be stored in the first bank group BG1 may be received.

When the second time tCCD_S is elapsed, the target bank group may be changed from the first bank group BG1 to the second bank group BG2. Thereafter, data to be stored in the second bank group BG2 may be received.

In some embodiments, in each of the first bank group BG1 and the second bank group BG2, data may be sequentially stored in the column stride scheme. In this way, the single serialized write interfacing scheme according to some embodiments may also be applied to the DDR5.

Figure 11F:
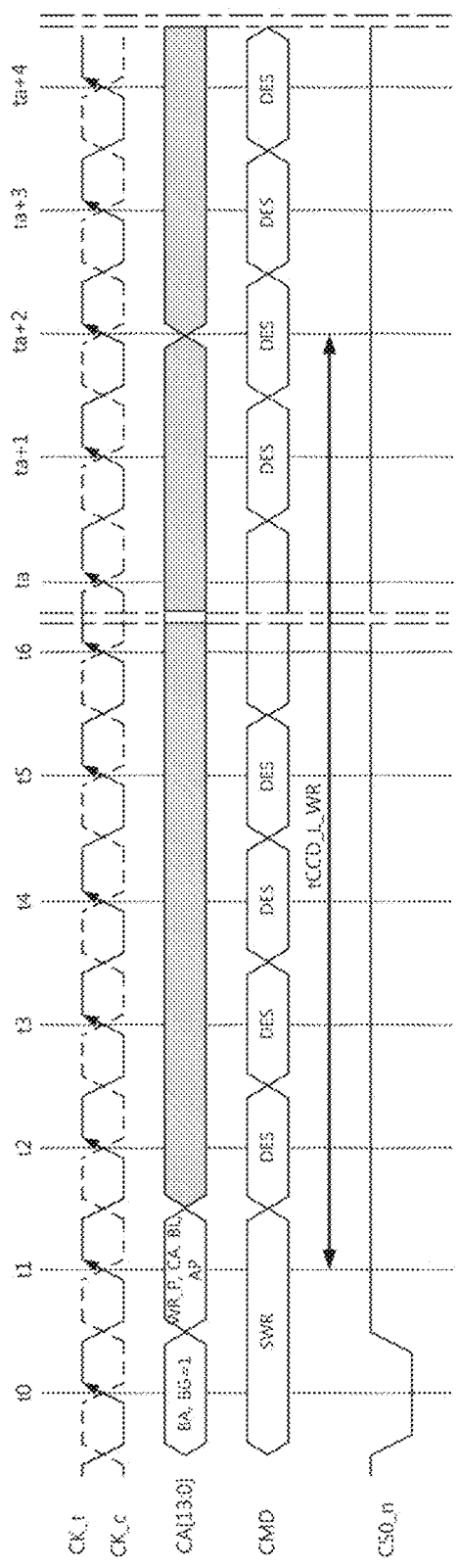

FIG. 11F is a diagram illustrating another example of a single serialized write interfacing scheme in which data corresponding to a same bank group are successively received, according to some embodiments. For example, in FIG. 11F, the DDR5 is supported, and the burst length BL may be 16. The single serialized write interfacing scheme of FIG. 11F and the single serialized write interfacing scheme of FIG. 11E are similar to each other. Therefore, for a brief description, additional description will be omitted below to avoid redundancy.

Unlike FIG. 11E in which data for different bank groups are received, data to be stored in a same bank group may be successively received in FIG. 11F. For example, when the toggle mode TM is disabled, data to be stored in the same bank group may be successively received.

In this case, data to be stored in the same bank group may be received based on a pulse width corresponding to the first time tCCD_L. The first time tCCD_L may be set longer than the second time tCCD_S of FIG. 11E, for example. In some embodiments, the order of the write operations for the selected same bank group may be performed in a column stride scheme.

As such, the single serialized write interfacing scheme according to some embodiments may also be applied to the same bank group.

Figure 12:
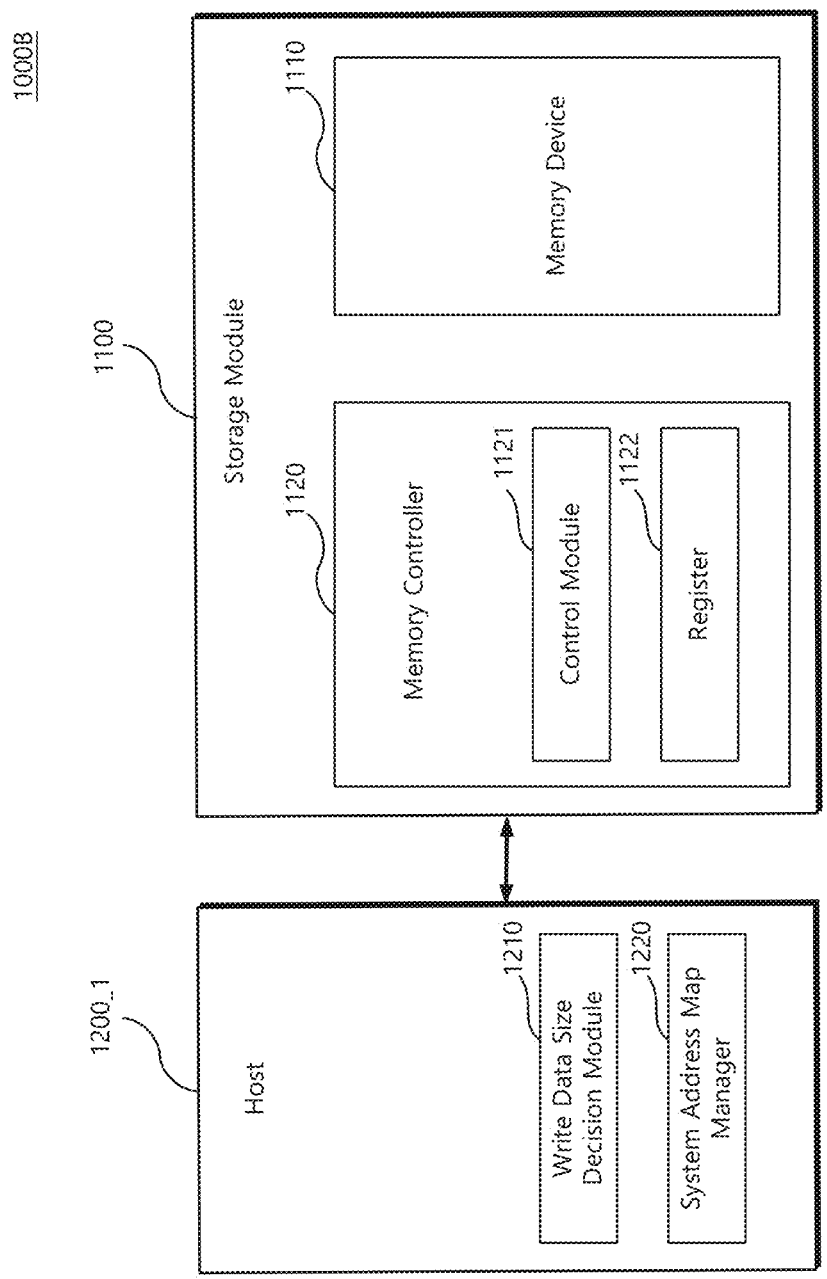
FIG. 12 is a block diagram illustrating an example of a memory system according to some embodiments.

FIG. 12 is a block diagram illustrating an example of the memory system 1000B according to some embodiments. The memory system 1000B of FIG. 12 is similar to the memory system 1000A of FIG. 1. Accordingly, the same or similar components are denoted using the same or similar reference numerals, and additional description will be omitted below to avoid redundancy.

Referring to FIG. 12, the memory system 1000B includes the storage module 1100 and a host 1200_1. The host 1200_1 includes the write data size decision module 1210 and a system address map manager 1220, and the storage module 1100 includes the memory device 1110 and the memory controller 1120.

Compared to the memory system 1000A of FIG. 1, the memory system 1000B of FIG. 12 may further include the system address map manager 1220. The system address map manager 1220 may configure a system address map. The system address map configured by the system address map manager 1220 may be used by the storage module 1100 to more accurately interpret the write data received from the host 1200_1. In other words, the storage module 1100 may more accurately interpret the write data by referring to the system address map, and accordingly, the write operation may be more accurately performed.

Figure 13:
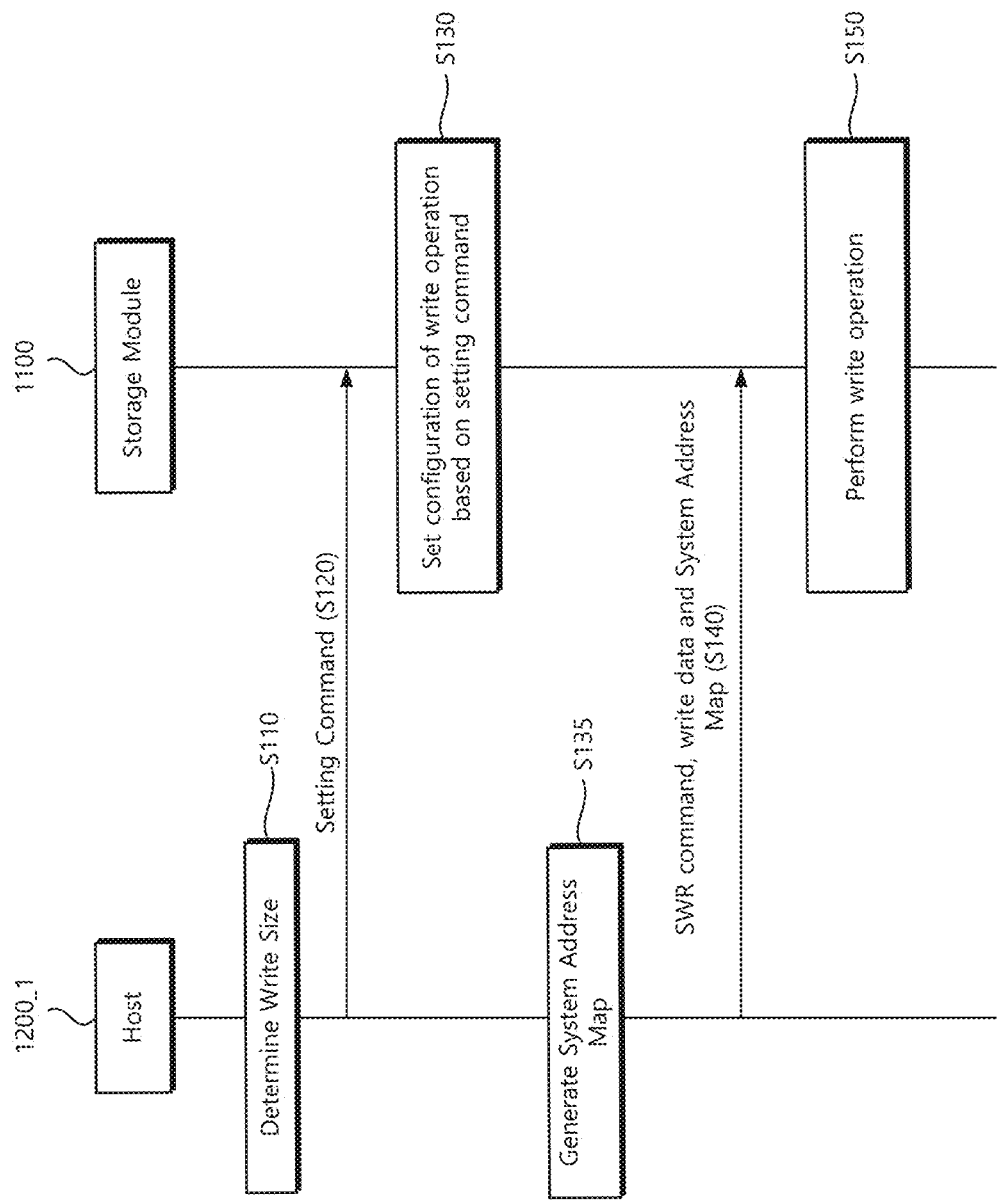
FIG. 13 is a flowchart illustrating an example of an operation of the memory system of FIG. 12, according to some embodiments.

FIG. 13 is a flowchart illustrating an example of an operation of the memory system 1000B of FIG. 12, according to some embodiments.

In operation S110, the host 1200_1 may determine a write size. For example, the host 1200_1 may determine the size of write data to be transmitted through the single serialized interfacing scheme.

In operation S120, the host 1200_1 may transfer a setting command. For example, the host 1200_1 may determine a mode register value based on the determined number of cache lines CL, and may transfer the setting command including the determined mode register value to the storage module 1100 through a CMD bus.

In operation S130, the storage module 1100 may set a configuration of a single serialized write operation based on the setting command. For example, the storage module 1100 may decode the mode register value and may set a characteristic value associated with write data to be received through the single serialized interfacing scheme based on the decoded mode register value. For example, the storage module 1100 may decode the mode register value to identify information on the number of CL unit data NCD to be successively received, the toggle mode TM, and/or the time tCCD, and may set the characteristic value with respect to the information.

In operation S135, the host 1200_1 may generate a system address map.

In operation S140', the host 1200_1 may transfer the single write command SWR, write data, and the system address map to the storage module 1100 through the CMD bus. In this case, the single write command SWR, the write data, and the system address map may be transferred through the single serialized write interfacing scheme.

In operation S150, the storage module 1100 may perform a write operation. For example, the storage module 1100 may perform a write operation of writing the received write data in the memory device 1110 (refer to FIG. 12). In an embodiment, the storage module 1100 may perform the write operation on each bank group with reference to the system address map.

As such, the storage module 1100 may refer to the system address map during the write operation, and thus the accuracy of the write operation may be further improved.

Figure 14A:
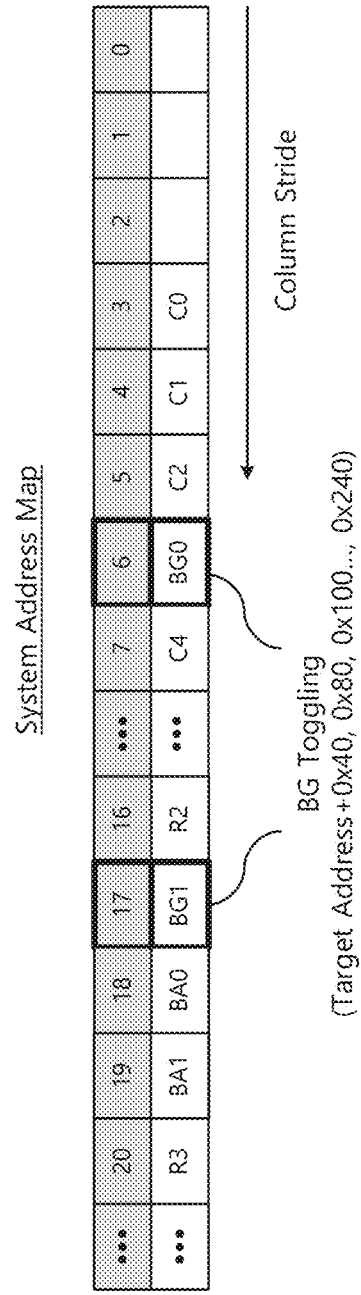
FIGS. 14A and 14B are diagrams for describing a system address map in more detail, according to some embodiments.
Figure 14B:
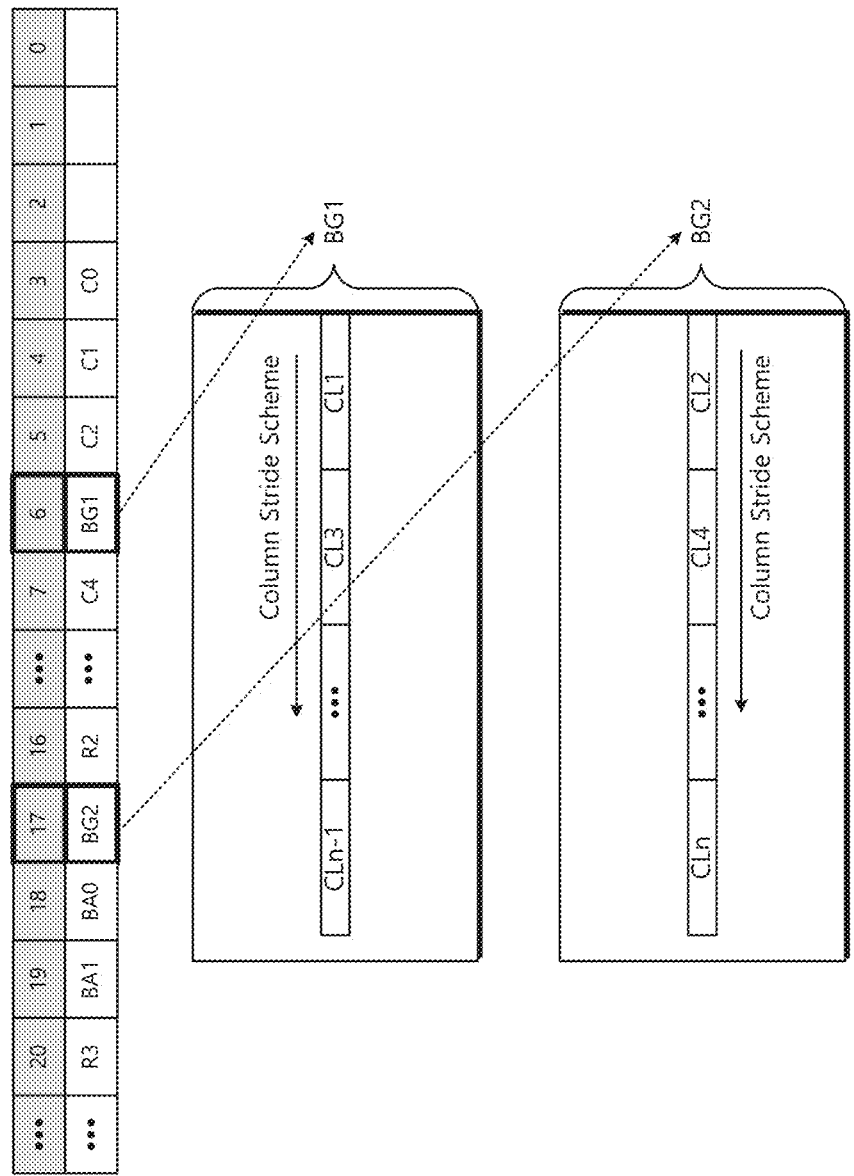

FIG. 14A is a diagram illustrating an example of a system address map configured by the system address map manager 1220, and FIG. 14B is a diagram illustrating an example in which a write operation is performed with reference to the system address map, according to some embodiments. For convenience of description, FIGS. 14A and 14B illustrate a system address map for a case in which write operations are alternately requested to different bank groups.

Referring to FIG. 14A, the system address map may be sequentially configured from right to left along the column stride direction. In some embodiments, by reflecting that the data in units of the cache lines CL are transmitted from the host 1200 to the storage module 1100 based on the second time tCCD_S, the system address map may also indicate that bank groups are alternately selected, based on the size of the cache line CL. For example, it is assumed that the size of the cache line CL is 64 bytes, and data in units of 10 cache lines CL are successively transmitted to the storage module 1100. In this case, the system address map may be configured to indicate that the bank group is changed at an address of target address, target address+0x40, target address+0x80, target address+0xC0, target address+0x100, target address+ 0x140, target address+0x180, target address+0x1C0, target address+0x200, and target address+0x240.

In this case, referring to FIG. 14B, the storage module 1100 may alternately select the first bank group BG1 or the second bank group BG2 with reference to the system address map, and may perform the write operation on the selected bank group.

As such, the storage module 1100 may refer to the system address map during the write operation, and thus the accuracy of the write operation may be further improved.

According to some embodiments, the memory system may prevent a write to write gap from occurring on the DDR interface. Accordingly, interface performance may be optimized.

The above are specific embodiments for carrying out the present disclosure. Embodiments in which a design is changed simply or which are easily changed may be included in the present disclosure as well as the embodiments described above. In some embodiments, technologies that are easily changed and implemented by using the above embodiments may be included in the present disclosure. While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A method of operating a storage module, the method comprising:
   setting a characteristic value based on information received from a host, the information including information related to a size of write data in units of a plurality of cache lines; and
   successively receiving the write data in units of the plurality of cache lines based on a single write command received from the host,
   wherein the single write command is implemented by a single bit of a write command received from the host.

2. The method of claim 1, wherein successively receiving of the write data comprises alternately receiving data corresponding to different bank groups among a plurality of bank groups, based on an interval of a second time.

3. The method of claim 2, wherein alternately receiving the data comprises, based on the single write command:
   receiving data in units of the plurality of cache lines to be stored in a first bank group of the plurality of bank groups; and
   after receiving the data, receiving data in units of the plurality of cache lines to be stored in a second bank group of the plurality of bank groups that is different from the first bank group at the interval of the second time.

4. The method of claim 3, wherein a write operation with respect to the first bank group and a write operation with respect to the second bank group are each performed in one direction based on a column stride scheme.

5. The method of claim 1, wherein alternately receiving the data comprises:
   receiving data of a first size to be stored in a first bank group based on the single write command; and
   successively receiving data of a second size less than the first size to be stored in a second bank group that is different from the first bank group at an interval of a second time, based on the single write command, and
   wherein the first size is a same size as a size of the cache lines.

6. The method of claim 2, wherein alternately receiving the data comprises:
   receiving data of a first size to be stored in a first bank group based on the single write command; and
   receiving data of a second size greater than the first size to be stored in a second bank group that is different from the first bank group at the interval of the second time, based on the single write command, and
   wherein the second size is a same size as a size of the cache lines.

7. The method of claim 2, wherein alternately receiving the data comprises:
   receiving first data to be stored in a first bank group of the plurality of bank groups, based on the single write command; and
   receiving second data to be stored in a second bank group of the plurality of bank groups that is different from the first bank group, at the interval of the second time, based on the single write command, and
   wherein a size of the first data and a size of the second data are each less than a size of the cache lines.

8. The method of claim 1, wherein successively receiving the write data comprises successively receiving data to be stored in a same bank group based on a first time.

9. The method of claim 1, wherein the characteristic value includes a characteristic value related to a number of cache line unit data to be successively received.

10. The method of claim 9, wherein the characteristic value includes a characteristic value related to whether data are to be stored in a same bank group of a plurality of bank groups or whether data are to be stored in different bank groups of the plurality of bank groups.

11. The method of claim 1, wherein the information related to the size of the write data is transferred from the host through a mode register set (MRS) command or a mode register write (MRW) command, and
   wherein, during an update delay time for setting the characteristic value, a non-setting command is not transmitted from the host.

12. The method of claim 1, wherein the write command is a DDR write command, and the single bit is implemented using a bit of the DDR write command that is not defined in DDR.

13. A storage module comprising:
   a memory device that includes a volatile memory; and
   a memory controller configured to control the memory device, the memory controller including:
   a control module configured to decode a setting command received from a host to identify first information on a size of write data, and to determine a number of cache line unit data to be successively received from the host based on the size of the write data; and
   a register configured to store first information on the number of cache line unit data to be successively received,
   wherein the memory device includes a plurality of bank groups,
   wherein the control module is configured to decode the setting command to identify second information on a toggle mode that indicates whether the write data to be received is associated with different bank groups of the plurality of bank groups or a same bank group of the plurality of bank groups, and
   wherein the register stores the second information.

14. The storage module of claim 13, wherein the control module is configured to write the cache line unit data to the plurality of bank groups based on the toggle mode.

15. The storage module of claim 13, wherein the control module is configured to output a control signal for performing the write operation on the memory device based on a single write command received from the host, and
   wherein the control module generates the control signal based on the first information on the number of cache line unit data to be successively received and the second information on the toggle mode stored in the register.

16. The storage module of claim 15, wherein, when the toggle mode is enabled, the control module receives data corresponding to different bank groups of the plurality of bank groups at a time interval, and the memory device alternately performs the write operation on the different bank groups based on the control signal.

17. The storage module of claim 16, wherein the write operation for each of the different bank groups is performed depending on a column stride scheme.

18. The storage module of claim 15, wherein, when the toggle mode is disabled, the control module receives data corresponding to a same bank group of the plurality of bank groups at a time interval, and the memory device successively performs the write operation on the same bank group based on the control signal.

19. A memory system comprising:
   a host configured to determine a number of cache lines to be write-requested; and
   a storage module configured to receive information related to the number of cache lines from the host and a toggle mode that indicates whether the number of cache lines is associated with different bank groups of a plurality of bank groups or a same bank group of the plurality of bank groups, identify a number of cache line unit data to be successively received and bank groups of the plurality of bank groups associated with the number of cache line unit data based on the information, and successively receive data in units of the cache line unit data based on a single write command.

20. The memory system of claim 19, wherein the host further includes:
   a system address map manager configured to generate address information associated with data to be stored in the storage module.

* * * * *